United States Patent [19]

Olson

[11] Patent Number: 4,909,850

[45] Date of Patent: Mar. 20, 1990

[54] BONDING MATERIAL COMPOSITION FOR ALUMINUM OXIDE STRUCTURES AND METHOD FOR UTILIZATION OF THE BONDING MATERIAL

[75] Inventor: Donald M. Olson, Prescott Valley, Ariz.

[73] Assignee: Southtech Inc., Tempe, Ariz.

[21] Appl. No.: 286,082

[22] Filed: Dec. 19, 1988

[51] Int. Cl.$^4$ .......................... C08L 91/00; C09D 1/00
[52] U.S. Cl. ................................. 106/241; 106/286.7; 106/286.8; 427/383.5
[58] Field of Search .................. 106/241, 286.7, 286.8; 427/383.5

[56] References Cited

U.S. PATENT DOCUMENTS 3,801,363  2/1974  Buck ................................ 427/383.5
4,486,257  12/1984  Ebata ................................ 501/151

*Primary Examiner*—Theodore Morris
*Attorney, Agent, or Firm*—William W. Holloway

[57] ABSTRACT

A bonding material for $Al_2O_3$ is provided by preparing a mixture of 73.0% by weight of molybdenum, 8.5% by weight of manganese, 1.5% by weight of manganese fluoride, 6.0% by weight of lithium fluoride and 11.0% by weight of silicon dioxide, the percentages being approximate. The mixture is added to a carrier of pine oil, xylene and toluene and the resulting bonding compound is applied to the surfaces to be bonded. Polycrystalline or single crystal ($Al_2O_3$) surfaces with the bonding material applied thereto are dried and, after drying, the surfaces to be bonded are placed in contact. The resulting assembly is fired at a sufficiently high temperature for the formation of a bond between the surfaces. A polycrystalline or single crystal $Al_2O_3$ surface can be bonded to a metal surface by firing the $Al_2O_3$ surface having the bonding material applied thereto prior to placing the surfaces to be bonded in contact. The bonding compound can be used to improve the hermetic sealing of the bonded joints formed using the bonding compound and for plating a metal on an $Al_2O_3$ surface.

5 Claims, 1 Drawing Sheet ically, Al₂O₃ to a metallic material.

BONDING MATERIAL COMPOSITION FOR ALUMINUM OXIDE STRUCTURES AND METHOD FOR UTILIZATION OF THE BONDING MATERIAL

BACKGROUND OF THE INVENTION

1. Field of the Invention

This invention relates generally to the bonding of one material to a second material and, more particularly, to the bonding of a first metal strip or a second polycrystalline or single crystal surface to a first polycrystalline or single crystal surface. By way of specific examples, polycrystalline and single crystal $Al_2O_3$ can be bonded to polycrystalline (alumina) $Al_2O_3$, to single crystal $Al_2O_3$ (sapphire) or to metals such as kovar, stainless steel, nickel, molybdenum, etc.

2. Description of the Related Art

It is known in the prior art to bond a metallic path to a dielectric material object by preparing a mixture of approximately 80% molybdenum, 10% manganese and 10% silicon dioxide by weight. The mixture is added to a carrier material, such as pine oil, and applied to the dielectric object. The dielectric object is then heated to a temperature slightly above the boiling temperature of water (e.g., 105° C. to 110° C.) to remove any water vapor. The dielectric object is then heated above a temperature of 1000° C. As a result of this procedure, a metallic region is formed on the dielectric object. A metal strip having desired properties can be brazed, soldered or otherwise connected to the metallic region formed by the aforementioned procedure.

The foregoing procedure has not proven satisfactory for bonding and for metalizing polycrystalline and single crystal materials, especially those materials having $Al_2O_3$ or similar composition. When a metal strip is brazed or otherwise coupled to the region metalized by the foregoing procedure, force on the coupled metal strip can result in the metalized region being separated, along with the metal strip, from the polycrystalline or single crystal material. In addition, the requirement of a separate step to attach a metal strip to the metalized region increases the complexity of fabrication of a component.

Therefore, a need has been felt for a bonding material and a technique for using the bonding material that provides increased structural integrity as well as permitting the coupling of metallic strips to a polycrystalline or single crystal substrate. Furthermore, a need has been felt for a bonding material and technique that permits polycrystalline or single crystal $Al_2O_3$ to be bonded to polycrystalline $Al_2O_3$, single crystal $Al_2O_3$ to be bonded to polycrystalline $Al_2O_3$ and metallic strips to be bonded to $Al_2O_3$ structures. A need has also been felt for a (bonding) material that can be used to fabricate vacuum tight structures.

FEATURES OF THE INVENTION

It is an object of the present invention to provide an improved bonding material.

It is a feature of the present invention to provide an ion exchange bonding material.

It is another feature of the present invention to provide a bonding compound capable of bonding polycrystalline $Al_2O_3$ or single crystal $Al_2O_3$ to polycrystalline $Al_2O_3$ or to single crystal $Al_2O_3$.

It is another feature of the present invention to provide a bonding compound capable of bonding polycrystalline $Al_2O_3$ or single crystal $Al_2O_3$ to a metallic material.

It is a still further feature of the present invention to provide a compound for forming a metal area on a polycrystalline or single crystal $Al_2O_3$ surface.

SUMMARY OF THE INVENTION

The aforementioned and other features are attained, according to the present invention, by preparing a mixture generally having the composition of 73.0% molybdenum, 8.5% manganese, 1.5% manganese fluoride, 6.0% lithium fluoride and 11.0% silicon dioxide. This mixture is added to a carrier material consisting of pine oil, xylene and toluene in the preferred embodiment. The mixture and the carrier material are agitated. The resulting compound is applied to cleaned polycrystalline or single crystal $Al_2O_3$ surfaces. The surfaces having the compound applied thereto are dried and the surfaces to be bonded are placed in contact. The resulting structure is fired and the bond between the contacting surfaces is formed. The bonding compound can be used to bond an $Al_2O_3$ surface to a metal surface by firing the $Al_2O_3$ surface with the bonding compound prior to placing the two surfaces to be bonded in contact. A procedure is described for improving the seal of the bonded joint against a pressure differential imposed on either side of the seal.

These and other features of the invention will be understood upon reading of the following description along with the drawing.

DESCRIPTION OF THE PREFERRED EMBODIMENT

1. Detailed Description of the Figure

Figure 1:
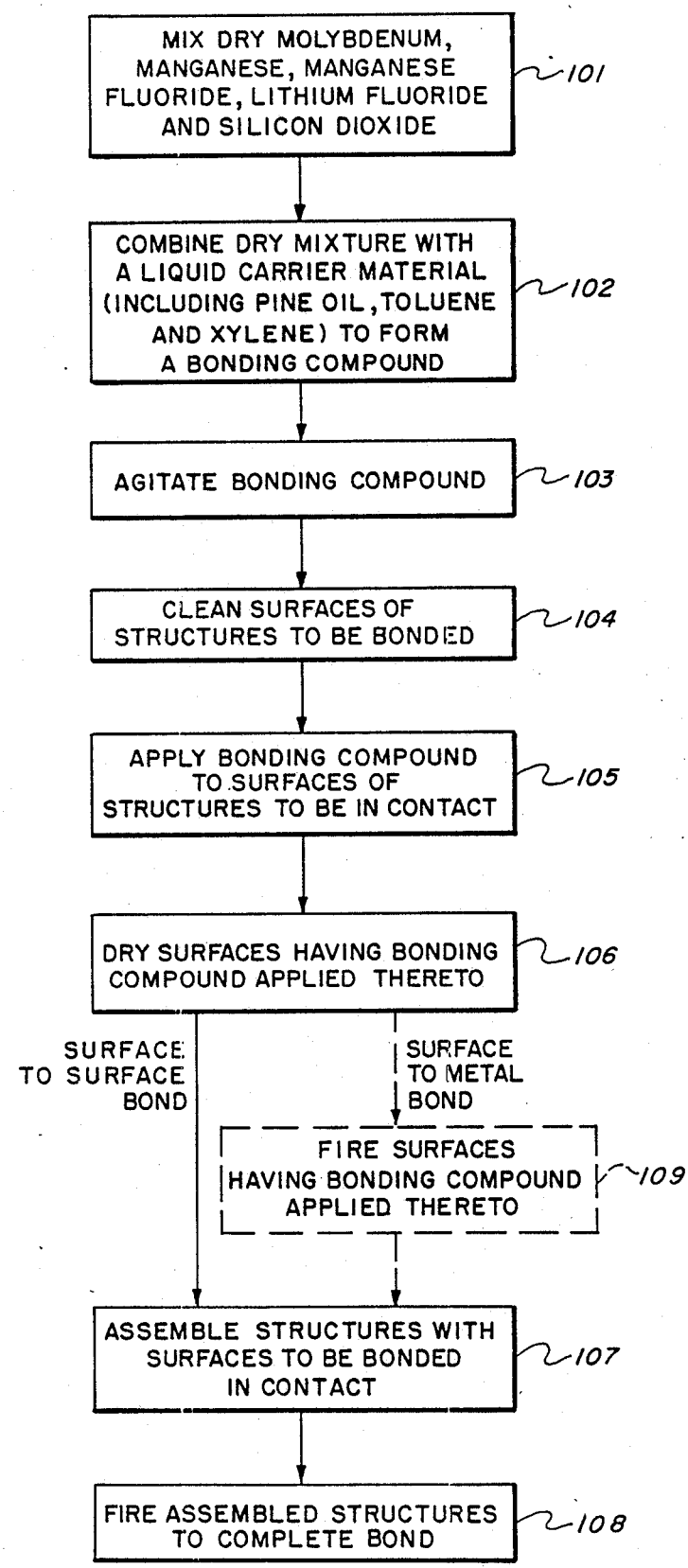
FIG. 1 illustrates the process for bonding a first aluminum oxide surface to a second aluminum oxide surface or to a metal surface.

In step 101 of FIG. 1, the following dry solids are mixed thoroughly together in approximately the designated proportions:

| | |
|---|---|
| Molybdenum (Mo) | 73.0% |
| Manganese (Mn) | 8.5% |
| Manganese Fluoride (MnF₂) | 1.5% |
| Silicon Dioxide (SiO₂) | 11.0% |
| Lithium Fluoride (LiF) | 6.0%, | wherein the percentages are weight percentages. The dry solids are mixed together in a non-reactive vessel, such as a Teflon vessel. Metal tools are not used in the mixing process and care is taken to prevent moisture from coming in contact with the mixture. The mixture can be stored in a non-reactive container (e.g., Teflon with no metal cap) until the mixture is combined with a liquid carrier material.

A liquid carrier material of 86.7% pine oil (natural or synthetic), 6.7% toluene ($C_6H_5CH_3$) and 6.6% xylene $\{(CH_3)_2C_6H_4\}$, wherein the percentages are volume percentages, is prepared. The dry solids mixture, described above, is added to the liquid carrier material (avoiding the use of metal or glass tools) in step 102. In the preferred embodiment, a sample bonding material includes the addition of 85 grams of the solid mixture to 120 milliliters of liquid carrier material.

The bonding compound (i.e., the combination of the dry solids mixture and the liquid carrier material) is agitated in a closed container in step 103. In the closed container are included high purity alumina ($Al_2O_3$) balls. In the preferred embodiment, the combination is agitated on a horizontal roller type unit at 30 to 45 revolutions per minute. The combination is agitated for 30 hours. If the resulting compound is not used immediately, the compound should be agitated for two hours prior to use.

Prior to the application of the bonding compound to a polycrystalline or single crystal surface, the surface must be cleaned, in step 104, for maximum bonding strength. For polycrystalline or single crystal $Al_2O_3$ structures, the surfaces are cleaned by totally submerging the surface in very warm, but not boiling aqua regia ($HCl$—$NHO_3$) for 8 to 10 minutes. The surface of the polycrystalline or single crystal structure to be bonded is rinsed thoroughly with de-ionized water. The rinsed polycrystalline or single crystal structure surfaces are dried in an oven having a temperature range of 105° C. to 110° C. in a dust free environment. After drying, the polycrystalline or single crystal structures are to be handled only when gloves are used to minimize contamination. When the structures are not to be bonded immediately, the structures are stored in non-metallic, covered containers or wrappings. With respect to metal structures (e.g., stainless steel, nickel, molybdenum), the metal structures are cleaned with a good quality degreasing material. The surface of the metal structure is rinsed with de-ionized water, followed by a methanol ($CH_3OH$) rinse. The metal structures are dried in a dust free environment at 105° C. to 110° C. and stored in non-metallic covered containers. As with the polycrystalline and single crystal structures, the cleaned and dried surfaces are to be handled only while wearing gloves.

Surface to Surface Bonding

To bond a polycrystalline or single crystal surface to a polycrystalline or single crystal surface, the areas to be joined are coated with a thin even layer (approximately 0.002 inches to 0.003 inches) of the bonding compound in step 105. (Care should be taken not to inadvertently deposit the bonding compound on a surface for which bonding is not intended because mild surface etching can even occur at room temperature). The bonding compound can be applied, for example, using camel hair brushes. In step 106, the coated surfaces are oven dried at 105° C. to 110° C., the coated surfaces being kept from contact with other surfaces.

The polycrystalline or single crystal structures to be bonded are assembled, in step 107, with each coated surface in contact with the coated surface to which it is to be bonded. The polycrystalline or single crystal structures are stabilized against slippage of the contacting surfaces. The stabilized structures are fired at temperatures of 1470° C. for 30 minutes in a wet hydrogen ($H_2$) atmosphere in step 108.

Surface to Metal Bonding

The bonding of polycrystalline or single crystal ($Al_2O_3$) structures to metal structures can be performed directly, without providing a metal contact and subsequently brazing or soldering the metal structure to the polycrystalline or single crystal structure. The polycrystalline or single crystal structures have the bonding compound applied thereto and are dried as described above in the surface to surface bonding procedure. The unassembled polycrystalline and single crystal structures are fired at a temperature of 1470° C. as described in the surface to surface procedure in step 109. The metal surfaces to be bonded to the structure have a thin coating 0.002 inches to 0.003 inches) of the bonding material uniformly applied thereto in step 105. The coated metal structures are dried at temperatures of 105° C. to 110° C. in an ambient atmosphere or in a dried environment in step 106. The coated surfaces are prevented from coming in contact with each other during this operation.

The coated and dried metal structure surfaces and the coated and fired polycrystalline or single crystal structure surfaces are assembled and stabilized against relative motion in step 107. In step 108, the assembled (dielectric and metal) structure is fired at a temperature of 1250° C. to 1300° C. in a wet hydrogen ($H_2$) atmosphere (except that stainless steel must be fired in a dry hydrogen atmosphere).

Hermetic Surface to Surface and Metal to Surface Bonding

For certain assembled structures, the bonded region or joint must be vacuum tight (i.e., for the structures to be hermetically sealed). In order to accomplish the sealing, the assembled, fired (and therefore bonded) structures have the bonding compound applied to the area of the structure joint exposed to the external environment and, when possible, the surfaces of all joints are facing the vacuum (i.e., low pressure) side of the structure. (The recoating of the vacuum side of the joints of the bonded structure will reduce virtual leaks). After recoating the joints with the bonding compound, the bonding material is dried at 105° C. to 110° C. in the ambient atmosphere (in an oven or with infrared lamps for large assembled structures). The assembled structures with the dried bonding compound on the joint areas are fired at temperatures of 1000° C. to 1100° C. in a wet hydrogen ($H_2$) atmosphere for 15 to 20 minutes. (When a stainless steel to $Al_2O_3$ joint is to have the seal improved, a dry hydrogen atmosphere is used).

Plating

When a requirement exists for plating over the metalized paths or areas on the polycrystalline or single crystal materials (for brazing, soldering or environmental protection), nickel is plated, using standard or electrodeless techniques, over the metalized areas of the structure. The metalized areas are created by firing the bonding compound on the surface of the aluminum oxide material. The resulting structure is fired (i.e., in a furnace) at temperatures of 800° C. to 850° C. in a wet hydrogen atmosphere for 10 to 15 minutes.

2. Operation of the Preferred Embodiment

The foregoing description provides a process for obtaining a bonding compound and a process for using the bonding compound to bond polycrystalline $Al_2O_3$ surfaces together and to bond a polycrystalline $Al_2O_3$ surface to a metal surface. The same bonding compound can also be used to bond polycrystalline $Al_2O_3$ and single crystal $Al_2O_3$ together, to bond single crystal $Al_2O_3$ surfaces together and to bond single crystal $Al_2O_3$ surfaces to metal surfaces. In addition, a procedure for improving the integrity of a joint created by bonding two surfaces (using the compound of the present invention) against a pressure differential can be implemented using the compound of the present invention in the procedure described above. The bonding compound can also be used to form a metalized area on the $Al_2O_3$ to which, for example, a metal plating material can be applied.

While the foregoing instructions describe the process of preparing and using the bonding compound of the preferred embodiment of the present invention, it will be clear that many comments involving acceptable laboratory procedures have been omitted. For example, xylene and toluene are believed to be carcinogenic materials and contact therewith, including inhalation of the vapors, should be avoided. Similarly, hydrogen gas ($H_2$) is flammable and caution should be exercised in handling this material.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A bonding material for bonding in exchange metallic and polycrystalline or single crystal $Al_2O_3$ materials to a polycrystalline or single crystal substrate fabricated from $Al_2O_3$ or similar material, said bonding material including a mixture comprising:
   molybdenum having approximately 73% of the total mixture weight;
   manganese having approximately 8.5% of the total mixture weight;
   manganese fluoride ($MnF_2$) having approximately 1.5% of the total mixture weight;
   lithium fluoride having approximately 6.0% of the mixture weight; and
   silicon dioxide ($SiO_2$) having approximately 11.0% of the mixture weight.

2. The ion exchange material of claim 1 further comprising a carrier material.

3. The ion exchange material of claim 2 wherein said carrier material includes natural or synthetic pine oil.

4. The ion exchange material of claim 3 wherein said carrier material includes at least one liquid selected from the group of xylene and toluene.

5. The ion exchange material of claim 1 wherein said carrier material and said mixture are agitated prior to use.

* * * * *